Jan. 15, 1924.　　　　　J. P. MAHONEY　　　　　1,480,826
MILK BOTTLE CLOSURE
Filed Dec. 19, 1922

Inventor

J. P. Mahoney.

By Lacey & Lacey, Attorneys

Patented Jan. 15, 1924.

1,480,826

UNITED STATES PATENT OFFICE.

JOHN PATRICK MAHONEY, OF AMSTERDAM, NEW YORK.

MILK-BOTTLE CLOSURE.

Application filed December 19, 1922. Serial No. 607,874.

*To all whom it may concern:*

Be it known that I, JOHN P. MAHONEY, a citizen of the United States, residing at Amsterdam, in the county of Montgomery and State of New York, have invented certain new and useful Improvements in Milk-Bottle Closures, of which the following is a specification.

This invention relates to improvements in milk bottle closures, and has as its general object to provide a closure which will be sanitary and which may be conveniently employed, after the ordinary pasteboard cap has been removed from the mouth of the bottle, as a means for closing or sealing the bottle and preventing contamination of its contents, the device of course permitting the contents to be dispensed as desired.

One of the primary objects of the present invention is to provide a milk bottle closure of the type mentioned above which will be sanitary in that it may be conveniently removed from the bottle and sterilized or otherwise cleaned before being again used.

Another object of the invention is to so construct the device that it will be adapted to fit bottles of various sizes and effectually close the same until such time that it is desired to dispense the contents of the bottle.

Another object of the invention is to provide a closure of the type mentioned which may be readily manipulated to either effect opening or closing of the mouth of the milk bottle and which, when in either position, will so remain until otherwise adjusted.

Another object of the invention is to provide the device with means adapted to be employed for the purpose of removing the ordinary pasteboard cap prior to application of the device to the bottle.

Figure 1:
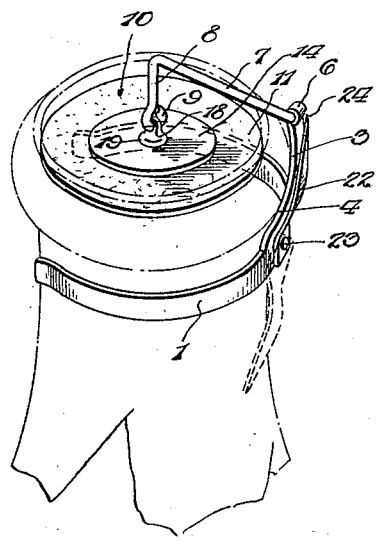
Figure 1 is a perspective view of the device embodying the invention applied to a milk bottle, the milk bottle being shown in dotted lines.

The device embodying the invention comprises an open annular clip 1, preferably formed of resilient sheet metal and adapted to be fitted to and embrace the neck of the milk bottle, indicated by the numeral 2. An arm 3 extends upwardly from the clip 1 at a point preferably midway between its ends and may be either integrally formed with said clip or initially formed separate therefrom and secured thereto. This arm is preferably outwardly curved, as at 4, above its juncture with the clip 1 so as to adapt it to extend upwardly beside the bead 5 which surrounds the mouth of the milk bottle 2, and the arm is of such length that its upper end will be located some distance above the top of the mouth and is overturned to form an eye indicated by the numeral 6. The numeral 7 indicates an arm which has a laterally turned end pivotally fitting in the eye 6 so that the arm may have vertical swinging movement, and this arm extends diametrically above the mouth of the milk bottle, in the applied position of the device, and has its outer end portion turned downwardly at right angles as indicated by the numeral 8 and provided at its lower extremity with an eye 9.

The closure proper is indicated in general by the numeral 10 and comprises a flat circular body 11 which may be of rubber or any other material adapted to serve as a sealing medium and capable of being sterilized or otherwise cleansed. This body is adapted to seat at its periphery upon the usual shoulder 12 provided within the mouth of the milk bottle and upon which shoulder the periphery of the ordinary pasteboard cap is seated when the cap is in position closing the mouth of the bottle, it being understood that in the use of the device embodying the invention, the body 11 will take the place of said cap.

Figure 2:
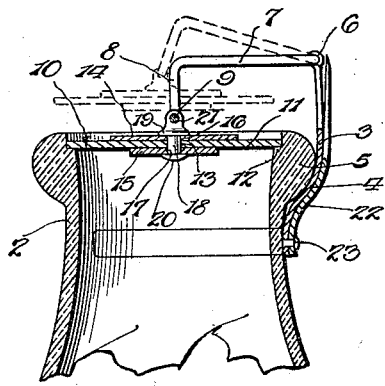
Figure 2 is a vertical diametric sectional view through the device applied to a milk bottle.

The body 11 is formed centrally with an opening 13, and washers 14 and 15 are preferably disposed against the upper and under sides of the body and are formed with openings 16 and 17 which register with the opening 13. A stem 18 is fitted through the registering openings 13, 16 and 17 and is provided with a shoulder 19 engaging the upper side of the washer 14 and has its lower end headed or riveted as at 20 to engage the under side of the washer 15, the stem being in this manner secured to the body 11, and the body being reinforced by the said washers 14 and 15. The stem 18 projects above the shoulder 19 thereon and has its projecting end formed with an opening 21 in which the eye 9 is engaged, the down bent end 8 of the arm 7 being in this manner pivotally connected with the closure 10. It will now be evident that when the arm 7 is swung to the full line position shown in Figure 2 of the drawings, in the applied position of the device, the body 11 will seat within the mouth of the milk bottle and rest at its periphery upon the shoulder 12. When it is desired to dispense the contents of the bottle, it is only necessary to swing the arm 7 upwardly as indicated in general in dotted lines in said Figure 2, so as to withdraw the closure body 11 from the mouth of the bottle.

In order that the device may be employed for the purpose of removing the ordinary pasteboard closure cap prior to application of the device to the milk bottle, a prong 22 is swiveled at one end, as at 23, to the clip 1, at the juncture of the lower end of the arm 3 with said clip and is provided with a pointed end 24, the prong being curved to conform to the linear curvature of the said arm 3 and being adapted to normally extend in an upright position beside the said arm with its point 24 located in close proximity to the eye 6 at the upper end of the arm and thus, in a sense, protected. It will be understood, of course, that by swinging the prong upon its swivel 23, its pointed end may be caused to pierce the pasteboard cap and the prong may then be manipulated to remove said cap from the mouth of the bottle, after which the prong may be returned to its normal position and the device may be applied to the neck of the bottle and employed in the manner previously described.

Figure 3:
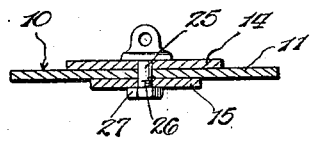
Figure 3 is a diametric sectional view through a modified form of the invention.

In that form of the invention above described, the stem 18 is permanently fixed through the body 11 of the closure 10, but it will be understood that if desired a modified structure such as illustrated in Figure 3 of the drawings, may be employed and in this figure the stem which is indicated by the numeral 25 has its lower portion threaded as indicated by the numeral 26 to adapt it for the application of a nut 27 which, when tightened, bears against the under side of the washer 15. In this form of the device, should the body 11 of the closure 10 become damaged or worn, it may be readily replaced by removing the nut 27.

Having thus described the invention, what is claimed as new is:

1. In a closure device, an attaching clip, a supporting arm extending upwardly therefrom, an arm pivoted to the first-mentioned arm and having a depending terminal portion, and a closure pivotally supported from the said terminal portion of the second-mentioned arm.

2. In a closure device, an attaching clip, a supporting arm extending upwardly therefrom, an arm pivoted to the first-mentioned arm and having a depending terminal portion, a closure, and a stem supporting the closure and pivotally connected with the terminal portion of the second-mentioned arm.

3. In a closure device, an attaching clip, a supporting arm extending upwardly therefrom and having an eye at its upper end, an arm having a pintle portion pivotally fitting the said eye and having a terminal portion directed downwardly, and a closure pivotally supported from the lower end of the said terminal portion of the second-mentioned arm.

4. In a closure device, an attaching clip to encircle the neck of a bottle, a supporting arm extending upwardly from the intermediate portion of the clip, an arm pivotally connected with the supporting arm for swinging movement, a closure supported by the second-mentioned arm, and a prong swiveled upon the said clip and movable to position to extend beside the first-mentioned arm and to a position extending from the clip for use.

5. In a closure device, an attaching clip, a supporting arm extending upwardly therefrom, an arm pivoted to the first-mentioned arm for swinging movement, a closure comprising a disc body, washers disposed above and below the said body, and a stem secured through the washers and the said body and pivotally connected with the second-mentioned arm.

In testimony whereof I affix my signature.

JOHN PATRICK MAHONEY. [L. S.]